(12) United States Patent
Brox

(10) Patent No.: US 6,956,304 B2
(45) Date of Patent: Oct. 18, 2005

(54) INTEGRATED CIRCUIT AND METHOD FOR CONTROLLING A POWER SUPPLY THEREOF

(75) Inventor: Martin Brox, München (DE)

(73) Assignee: Infineon Technologies AG (DE)

( * ) Notice: Subject to any disclaimer, the term of this patent is extended or adjusted under 35 U.S.C. 154(b) by 10 days.

(21) Appl. No.: 10/389,782

(22) Filed: Mar. 17, 2003

(65) Prior Publication Data

US 2003/0218452 A1 Nov. 27, 2003

(30) Foreign Application Priority Data

Mar. 18, 2002 (DE) .......................... 102 11 912

(51) Int. Cl.[7] .................................................. H02J 1/00
(52) U.S. Cl. ........................... 307/87; 307/44; 327/539
(58) Field of Search ....................... 363/65; 323/272, 323/282, 284, 351; 307/43–45, 57, 58, 64, 65, 80, 82, 84–86, 115, 131, 87; 327/539–541

(56) References Cited

U.S. PATENT DOCUMENTS 4,879,504 A * 11/1989 McVey ........................ 323/272
5,249,155 A    9/1993 Arimoto et al.
5,283,762 A    2/1994 Fujishima
5,471,130 A * 11/1995 Agiman ........................ 323/303
5,886,561 A *  3/1999 Eitan et al. .................. 327/408
6,118,188 A *  9/2000 Youssef ........................ 307/43
6,262,567 B1 *  7/2001 Bartlett ........................ 323/303
6,559,629 B1 *  5/2003 Fernald ........................ 323/313

FOREIGN PATENT DOCUMENTS

DE    4139163    12/1992
DE    4205040    12/1992
DE    4115082    12/1997
GB    2256949    12/1992

* cited by examiner

Primary Examiner—Gary L Laxton
(74) Attorney, Agent, or Firm—Moore & Van Allen PLLC; Steven B. Phillips

(57) ABSTRACT

Integrated circuit, which is supplied externally by a supply voltage, having at least one useful circuit and a power supply for the at least one useful circuit which comprises a plurality of power supply units, in which case the power supply comprises a control unit for comparing the supply voltage with a predetermined desired value and for switching one or a plurality of the switchable power supply units on or off in a manner dependent on the comparison result.

11 Claims, 2 Drawing Sheets

US 6,956,304 B2

INTEGRATED CIRCUIT AND METHOD FOR CONTROLLING A POWER SUPPLY THEREOF

BACKGROUND

The invention relates to an integrated circuit and to a method for controlling a power supply for such an integrated circuit.

Present-day microelectronic circuits use voltage generators on chip in order to generate a stable, defined voltage from the external supply voltage. Although the external supply voltage is predetermined, it can fluctuate within the specification limits.

A typical example is the generation of an internal voltage of 2.0 V from an external supply voltage of 2.5±0.2 V. For this purpose, a plurality of voltage generators are distributed over the chip. In this case, each of the plurality of voltage generators usually comprises a pFET or nFET transistor (pull-up transistor) and a comparator. The comparator is connected via an input to a stable reference voltage, which is generally generated by a bandgap reference circuit.

Particularly in the event of small differences between the supply voltage and the internal voltage, the problem arises, however, that the number of voltage generators used on the chip has to become very large. Since these voltage generators themselves require an operating current that is not small, a significant increase in the total operating current may thus result. At the present time, the number of voltage generators is chosen such that the internal voltage can still be generated even at the lowest permissible supply voltage. Moreover, for safeguarding purposes, further generators over and above this are also included in the design.

SUMMARY

It is an object of the present invention to optimize the number of generators which are actually in use in a manner dependent on the operating conditions.

This object is achieved by means of an integrated circuit and a method as exemplified by. The subclaims relate to preferred embodiments of the invention.

The way in which the above object is achieved according to the invention consists in the power supply units being connected in or disconnected in a manner dependent on the external voltage. Within the framework prescribed by the specification, a check is made to determine whether or not the external supply voltage lies above a predetermined desired value. If the external supply voltage lies above the desired value, the minimum number of power supply units is activated which suffices to generate the internal voltage from the higher supply voltage. Otherwise, additional generators are activated.

According to the invention, the integrated circuit, which is supplied externally by a supply voltage, having at least one useful circuit and a power supply for the at least one useful circuit which comprises a plurality of power supply units, is characterized in that the power supply comprises a control unit for comparing the supply voltage with a predetermined desired value and for switching one or a plurality of the switchable power supply units on or off in a manner dependent on the comparison result.

Preferably, the control unit comprises a low-current comparator for comparing the supply voltage with the predetermined desired value. In particular, the low-current comparator comprises a voltage divider between an operating voltage and ground in order to generate the desired value.

Preferably, the reference voltage is generated by a bandgap reference circuit.

According to the invention, the method for controlling a power supply for such an integrated circuit is characterized by the following steps: comparison of the supply voltage with a predetermined desired value and switching of one or a plurality of the switchable power supply units on or off in a manner dependent on the comparison result by a control unit.

Preferably, the comparison of the supply voltage is carried out stepwise with a plurality of predetermined desired values, so that the switchable power supply units are connected in a staggered manner.

In particular, the switchable power supply units are switched on and off with a hysteresis, thereby preventing oscillations.

One advantage of the solution according to the invention is that the control unit is relatively simple in its construction and therefore takes up little space on the chip.

Further features and advantages of the invention emerge from the following description of preferred exemplary embodiments, in which reference is made to the accompanying drawings.

DETAILED DESCRIPTION

Figure 1:
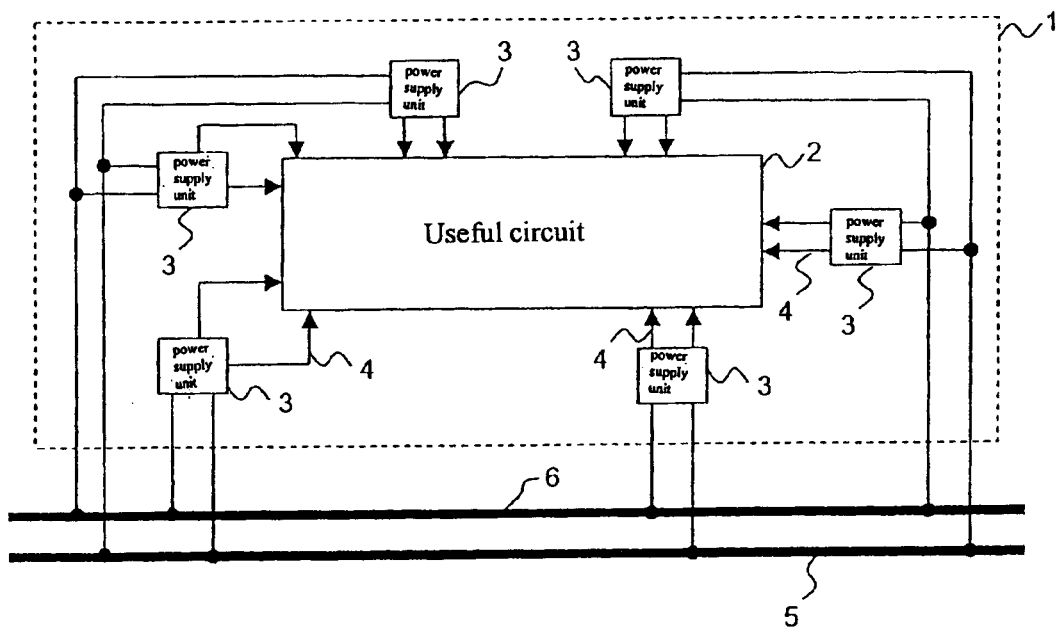
FIG. 1 shows a traditional integrated circuit having a useful circuit and a plurality of power supply units.

FIG. 1 illustrates an integrated circuit 1 on a chip, which has a useful circuit 2. The useful circuit 2 is supplied by a power supply integrated on the chip. The power supply is composed of a plurality of power supply units 3. The latter are distributed on the chip of the integrated circuit around the useful circuit 2, so that the lines 4 via which they are connected to the essential loads of the useful circuit 2 are as short as possible.

For their part, the power supply units 3 are connected to external supply lines 5 and 6, of which, by way of example, one is at the supply potential VDD and the other is grounded.

Figures 2, 3:
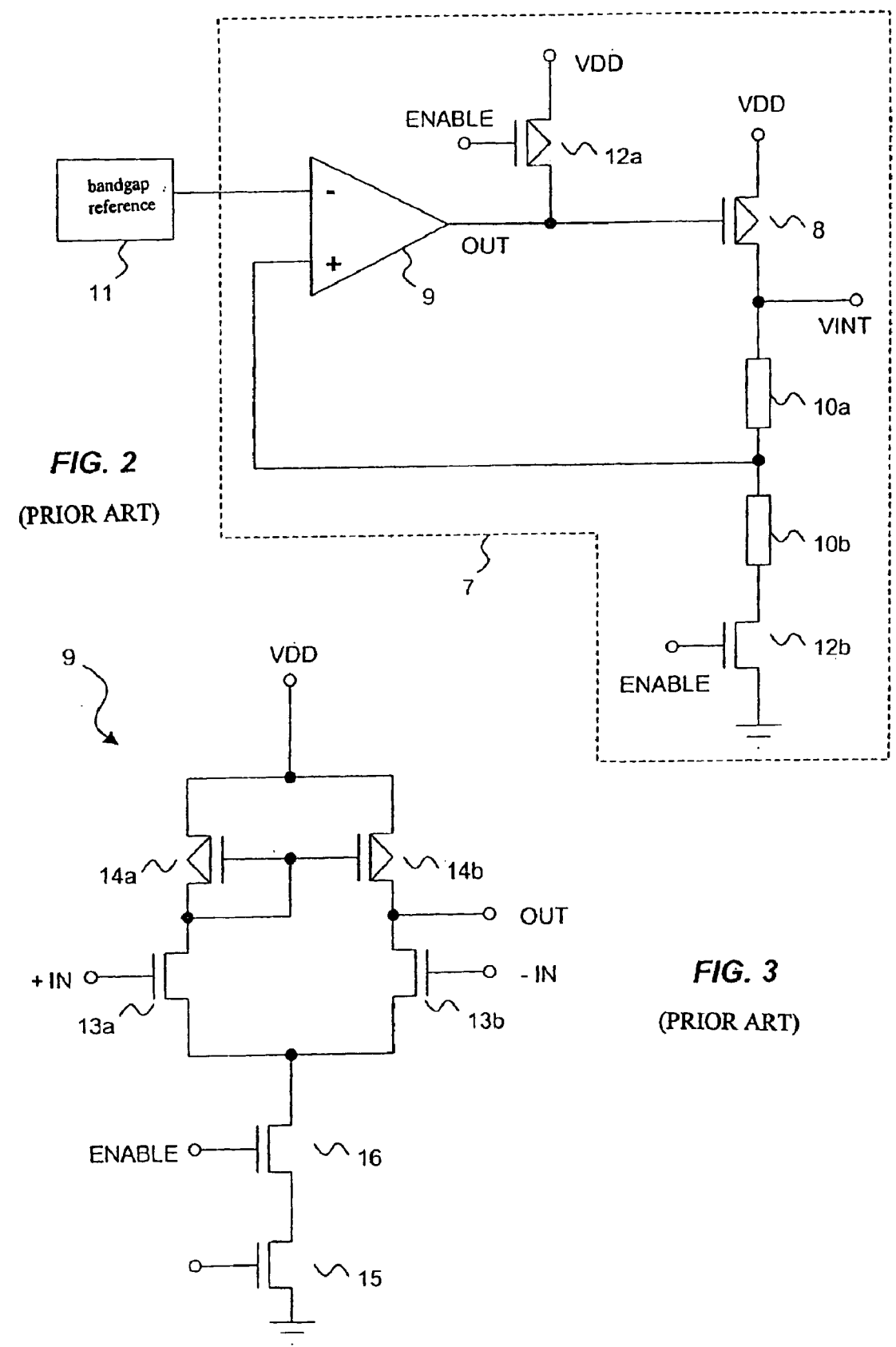
FIG. 2 shows a typical construction of a power supply unit.
FIG. 3 shows the construction of the comparator in the power supply unit according to FIG. 2.

FIG. 2 illustrates a typical power supply unit 3. It comprises an actual generator circuit 7, which in turn essentially has a driver stage 8 driven by a comparator 9. The driver stage 8, which is illustrated here as a pFET transistor, is connected between the (external) supply voltage VDD and ground. The source of the driver transistor 8 is connected to VDD and its gate is connected to the output OUT of the comparator 9. The internal supply voltage VINT is tapped off at its drain, which is grounded via a voltage divider 10a, 10b.

The first input of the comparator 9 (its noninverting input) is connected to the center tap of the voltage divider 10a, 10b. A reference voltage is present at the second (inverting) input of the comparator 9, said reference voltage being produced by a bandgap reference circuit 11 in the circuit illustrated. The bandgap reference circuit 11 is generally not part of the actual generator circuit 7; it is present only once on the chip and serves as reference voltage source for a plurality of different circuits.

The power supply unit 7 can be activated or brought to a quiescent state via one or a plurality of switching elements 12a and 12b.

FIG. 3 shows the construction of the comparator 9 in FIG. 2. It is a differential amplifier having a first nFET input transistor 13a at the noninverting input and a second nFET input transistor 13b at the inverting input. By way of example, the voltage which is dropped across the second resistor 10b of the voltage divider in FIG. 2 is present at the first transistor 13a. In this case, the voltage supplied by the bandgap reference circuit 11 is present at the second transistor 13b.

The source of the first input transistor 13a is connected to VDD via a first pFET transistor 14a, connected as a diode. The source of the second input transistor 13b is likewise connected to VDD via a pFET transistor 14b. The signal OUT for driving the driver transistor 8 is tapped off at the source of the second transistor 13b. The drain of the two transistors 13a and 13b is connected to a current source. The current source in the drain circuit of the two input transistors 13a and 13b is in this case illustrated as an nFET transistor 15. The connection of the drain of the two transistors 13a and 13b to the current source 15 can be interrupted by a switching element 16, at whose input an ENABLE signal is present.

Figure 4:
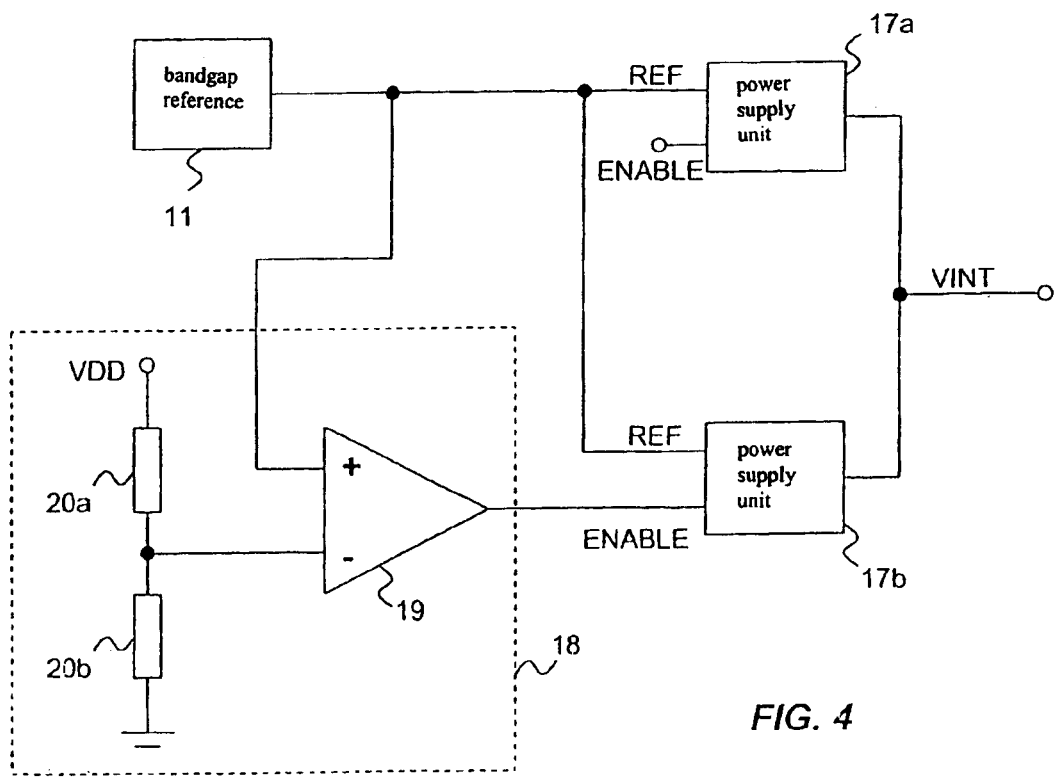
FIG. 4 shows an embodiment of the control unit according to the invention.

According to the invention, the ENABLE inputs of the circuits described above are used to selectively activate the circuits, or put them into a quiescent state, by means of a central control. FIG. 4 shows an embodiment of the power supply of an integrated circuit having a useful circuit (not illustrated) and a plurality of power supply units, two of which are illustrated, namely 17a and 17b. Both power supply units 17a and 17b refer to a bandgap reference circuit 11. They each have an ENABLE input via which they can be activated in the manner described above in connection with FIG. 2 and FIG. 3.

In the illustration in FIG. 4, the ENABLE input of the power supply unit 17a is not connected, so that it is permanently active. (It goes without saying, however, that the ENABLE input of the power supply 17a can also be routed to the outside, so that the power supply 17a can be switched on or off in a manner dependent on conditions that are not considered any further here.) By contrast, the power supply 17b is driven via its ENABLE input by a control unit 18. The control unit 18 comprises a low-current comparator 19, which compares the bandgap reference voltage with the actual supply voltage VDD that is applied externally. In practice, the low-current comparator 19 compares the bandgap reference voltage with a predetermined fraction of the external supply voltage VDD, which can be set very precisely by means of voltage dividers 20a, 20b. If said fraction of the external supply voltage VDD falls below the bandgap reference voltage of the circuit 11, i.e. below the desired value, a signal is output to the ENABLE input of the second power supply unit 17b, so that the latter is activated. By contrast, if the bandgap reference voltage of the circuit 11 falls below the fraction of the external supply voltage VDD, a signal is correspondingly output to the ENABLE input of the second power supply unit 17b, which signal causes the second power supply unit 17b to be disconnected.

It is thus ensured that, in a manner dependent on the magnitude of the external supply voltage, only as many power supply units 17b are switched on as are necessary for disturbance-free operation of the useful circuit 2.

The invention is not restricted to the above exemplary embodiments. Thus, the supply voltage VDD can be compared stepwise with a plurality of predetermined desired values. Each time one of the predetermined desired values is exceeded (a dedicated voltage divider 20a, 20b corresponding thereto), one of the plurality of switchable power supply units 17b is activated or brought to the quiescent state in a staggered manner.

In order to avoid excessively frequent, rapid connection and disconnection of power supply units 17b if the supply voltage VDD is near the (or a) desired value, the low-current comparator 19 has a hysteresis in a preferred embodiment (not illustrated), so that oscillations cannot occur. This technique is generally known to the person skilled in the art and, therefore, is not explained any further here.

FIG. 4 shows the simplest case, in which only one power supply unit 17b is activated when the desired value is exceeded. Consequently, only one permanently active power supply unit 17a and one power supply unit 17b that can be connected in or disconnected are thus illustrated. This is only one example, however. More generally, M of N power supply units 17b present are activated, so that the rule holds true that N power supply units 17b are active in the worst case, while only M power supply units 17b are active in more favorable conditions. In particular, in this case a plurality of power supply units 17b may be provided below the desired value, while at least one power supply unit 17b is operated above the desired value.

What is claimed is:

1. An integrated circuit, which is supplied by an external supply voltage, the integrated circuit comprising at least one useful circuit and a power supply operatively connected to the at least one useful circuit, the power supply further comprising:
   a plurality of power supply units for providing an internal supply voltage to the at least one useful circuit; and
   a control unit connected to the plurality of power supply units for comparing the external supply voltage with a predetermined desired value and producing a comparison result and for coupling and decoupling at least one of the plurality of power supply units to and from the external supply voltage in a manner dependent on the comparison result.

2. The integrated circuit according to claim 1, wherein the control unit further comprises:
   a low-current comparator for comparing the external supply voltage with the predetermined desired value.

3. The integrated circuit according to claim 2, wherein the low-current comparator further comprises:
   a voltage divider connected between the external supply voltage and ground.

4. The integrated circuit according to claim 2 further comprising:
   a bandgap reference circuit for generating a reference voltage.

5. The integrated circuit according to claim 3 further comprising:
   a bandgap reference circuit for generating a reference voltage.

6. The integrated circuit according to claim 1, wherein the external supply voltage is higher than the internal supply voltage.

7. The integrated circuit according to claim 1, wherein the at least one of the plurality of power supply units is switchable to and from the external supply voltage by at least one switching element.

8. A method for controlling a power supply in an integrated circuit, which is supplied by an external supply voltage, the integrated circuit having at least one useful circuit, the power supply comprising a plurality of power supply units for providing an internal supply voltage to the at least one useful circuit, the method comprising:

comparing the external supply voltage with a predetermined desired value to produce a comparison result; and coupling and decoupling at least one of the plurality of power supply units to and from the external supply voltage in a manner dependent on the comparison result.

9. The method according to claim 8, wherein the comparing of the external supply voltage further comprises:

comparing the external supply voltage stepwise with a plurality of predetermined desired values; and coupling and decoupling comprises coupling and decoupling at least a subset of the plurality of power supply units in a staggered manner.

10. The method according to claim 8, wherein:

the at least one of the plurality of power supply units are switched on and off with a hysteresis, thereby preventing oscillations.

11. The method according to claim 9, wherein:

the at least one of the plurality of power supply units is coupled and decoupled with a hysteresis, thereby preventing oscillations.

* * * * *

UNITED STATES PATENT AND TRADEMARK OFFICE
CERTIFICATE OF CORRECTION

PATENT NO. : 6,956,304 B2
DATED : October 18, 2005
INVENTOR(S) : Martin Brox

It is certified that error appears in the above-identified patent and that said Letters Patent is hereby corrected as shown below:

Column 1,
Line 40, after "by" delete ". The subclaims relate to".

Signed and Sealed this

Twenty-fourth Day of January, 2006

JON W. DUDAS
*Director of the United States Patent and Trademark Office*